April 14, 1931.  H. DE B. RICE  1,800,406
FOOTWEAR AND PROCESS OF MAKING THE SAME
Filed July 25, 1928

INVENTOR
Harold D. Rice
BY
Walter L. Pipes
ATTORNEY

Patented Apr. 14, 1931

1,800,406

UNITED STATES PATENT OFFICE

HAROLD DE BLOIS RICE, OF BRISTOL, RHODE ISLAND, ASSIGNOR TO NATIONAL INDIA RUBBER COMPANY, OF BRISTOL, RHODE ISLAND, A CORPORATION OF RHODE ISLAND

FOOTWEAR AND PROCESS OF MAKING THE SAME

Application filed July 25, 1928. Serial No. 295,358.

This invention relates to a new process for the manufacture of footwear, especially tennis footwear, and the article thereby produced. This invention is related to the invention of my copending application, Serial No. 295,357, filed July 25, 1928.

It has been customary in the manufacture of tennis shoes to apply top cement to the lower inner margin of the canvas upper and allow such cement to dry so as to form a tacky surface. Similar cement is applied to the bottom of the insole and allowed to dry. The insole is placed on a last, the cemented portion of the upper is placed against the cemented portion of the insole and the upper drawn down over the last to remove wrinkles therefrom and to cause the upper and insole to adhere together. The next step in the manufacture of tennis shoes is to apply a band of marking cement around the lower side portion of the canvas upper and at the same time to apply cement over the lower part of the shoe consisting of the bottom edge of the upper and the bottom of the insole. This cement is allowed to dry and a second coat of cement is similarly applied. A foxing is then applied to the lower side portion of the upper, the cement serving to hold the foxing to the upper. A filler sole and an outsole is applied to the bottom of a shoe, and the shoe finished in the usual manner.

This method of building canvas shoes is open to certain objections. The marking cement applied to the outside of the upper consists of about 25% rubber compound and 75% solvent. When the cement is applied the solvent penetrates through the fabric of the upper and comes into contact with the top cement which was employed to unite the insole with the upper thereby frequently causing the separation of the insole and upper which necessitates the relasting of the shoe. This relasting operation must be done by hand and is accordingly an expensive and usually a poorly executed operation. Another fault of the above described method of building shoes is that, due to the small percentage of rubber in the cement, the adhesion between the rubber and the fabric is frequently not sufficient to hold securely the foxing to the upper, so that it frequently happens that the foxing will peel off the shoe after a short period of use. The cost, inflammability and toxicity of the solvent used in cements is a further objection to the above described method.

It is an object of my invention to provide a new process for building tennis shoes which will produce a tennis shoe having a foxing more securely united to the upper and which will provide against the separation of the upper and the insole. Another object is to provide a shoe having a foxing formed in situ and a process for making such a shoe which is more economical than methods heretofore employed in the manufacture of footwear. Other objects and advantages of my invention will be apparent from the detailed description which follows.

In carrying out my process, the insole and upper are united with top cement as above described after which I may apply a first coat of cement on the lower side portion of the upper and the bottom of the insole and the bottom edge of the upper. The lasted upper and insole thus coated with cement is then preferably dipped into latex containing compounding ingredients whereby a thick coating of latex is formed along the lower side portion of the upper and over the bottom of the lasted upper and insole. The solid constituents of the latex may be deposited on the shoe by coagulation which may be accomplished by dipping the shoe with the latex thereon into a weak solution of acetic acid. This heavy coating of rubber deposited from latex is thick enough to serve as a foxing for the shoe, and since the rubber is applied in the form of a water dispersion containing a relatively large percentage of solid constituents and having great penetrating power, it penetrates the interstices of the fabric so that when the solid constituents are deposited on the fabric an inseparable union is obtained between the latex foxing and the upper of the shoe. The nature of the union between the latex and the fabric and the tough nature of the rubber deposited from latex results in a foxing which will not peel off as was found to be the fault with the foxing applied in the previously described method. Furthermore, the latex serves to form a union between the outer surface of the insole and the upper thereby preventing the insole and upper from opening up, which tendency might be caused by the application of a coat of cement previous to the coat of latex.

While a coat of cement may readily be applied prior to the application of the coat of latex, it is also my intention that a coat of latex may be first applied instead of the coat of cement over which said first coat of latex a second heavier coat of latex is applied by dipping as before described.

The application of the first coat of latex may be by brushing or by dipping or by the usual cementing machines now used. The second heavy coat of latex may be applied by dipping or by forming a thick band of latex paste from an extruding machine or by applying a thick coat of latex along the lower side portion of the upper with a machine similar to a cement applying machine. As many coats of latex or of cement as desired may be applied beneath the latex foxing, and the foxing itself may be built up by the application of several coats of latex if such a method of forming the foxing is desired. While I have disclosed my invention as using a first coat of either cement or latex beneath the latex foxing, the latex foxing itself may be applied directly to fabric if so desired.

The solid constituents may be caused to deposit on the fabric either by drying in atmospheric conditions or by drying in a heater chamber or by coagulation with a weak solution of acetic acid or in any other suitable fashion.

The foxing as applied may be finished by painting with either varnish or a pyroxylin varnish.

The accompanying drawings show an article of footwear made according to the above outlined process in which drawings—

Figure 1:
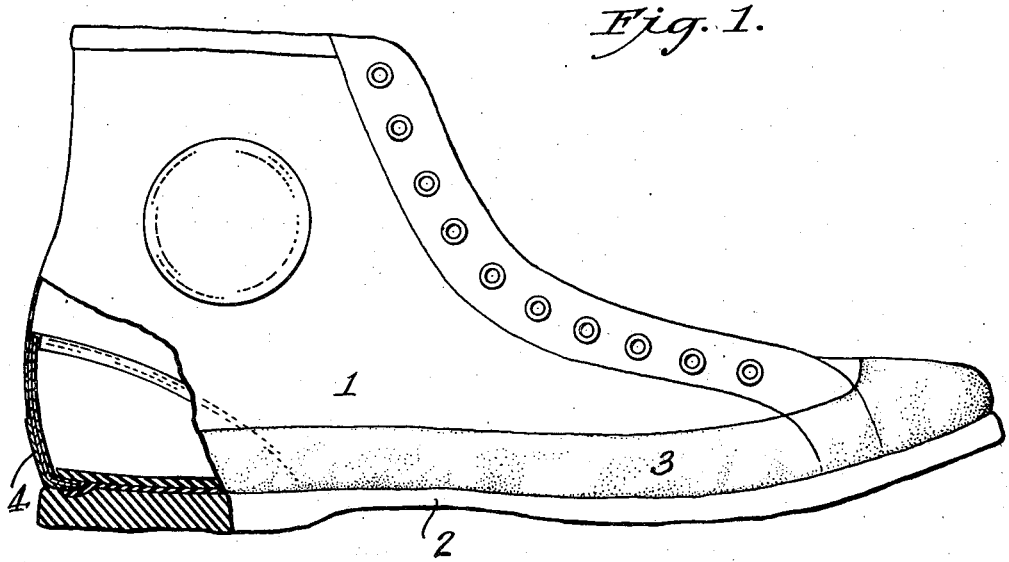
Figure 1 is a view in elevation of an article of footwear being cut away at the heel portion to show the construction in cross section.
Figure 2:
Fig. 2 is a detailed cross sectional view greatly enlarged of the foxing applied to the material of the shoe.

In the drawings, the numeral 1 indicates the shoe upper and the numeral 2 indicates the shoe sole. A foxing 3 extends around the shoe upper adjacent the sole to form a reinforcement. As shown at 4, in Fig. 1, and as shown in Fig. 2, the foxing construction is made up of a layer of fabric or like material 5 which forms the body of the shoe upper and the deposit of rubber 6 in which the fabric is embedded and which provides a layer of rubber on the outside surface of the fabric. The rubber 6 is deposited on the fabric in the manner herein described. Obviously, the rubber laid down from latex may be employed to form reinforcements and wear elements on other areas of the shoe.

While I have disclosed the formation of foxings directly from latex, it is not intended to limit my invention thereto inasmuch as other parts of an article of footwear, such as a heel reinforcement or an ankle pad might be formed from latex deposited in situ. The formation of such other parts of shoes falls within the scope of my invention.

The compounded latex employed in carrying out my invention consists of:

| | |
|---|---|
| Rubber (23 gallons of latex 55% solids) | 100 lbs. |
| Water in latex | 81 lbs. 13 ounces |
| Sulphur | 4 lbs. |
| Condensation product of heptaldehyde and aniline | 5 lbs. 13 ounces |
| Nekal (sulphonated oil) | 1 lb. |
| Glue | 3 lbs. 8 ounces |
| Rosin oil emulsion | 20 lbs. 10 ounces |
| Whiting | 10 lbs. |

A sufficient amount of water is added to the above ingredients to bring the total solid content to approximately 52%.

The latex used in the above composition is made from the pure latex by creaming with an agent such as alginate or Irish moss which creaming operation greatly improves the tackiness of the latex and reduces the amount of water soluble material present. A small amount of oil of winter-green (methyl salicylate) or something similar may be added to improve the odor of the rubber. The Nekal is a condensation product of an aromatic hydrocarbon with an aliphatic alcohol in the presence of sulphuric acid and serves as a preservative and also greatly increases the penetrating power of the latex. A satisfactory Nekal may be prepared from naphthalene, iso propyl alcohol and sulphuric acid, the sodium salt of the reaction product being used. This Nekal is a sulphonated oil in place of which chlorinated or nitrated oils might be used, which oils serve to increase the penetrating power of latex, although they might not serve as preservatives. The rosin oil emulsion serves as a softening agent and other suitable material such as paraffine oil and other mineral oils may be substituted therefor. The condensation product of heptaldehyde and aniline is added in the form of an emulsion and serves as an accelerator of vulcanization. Other accelerators may be substituted in the composition, such as diphenyl guanidine or other well-known accelerators. Other fillers may be added to the composition, such as zinc oxide and any desirable pigment may be used as convenient. The vulcanization of the rubber may be effected while in the form of a dispersion. Preferably, however, the rubber is vulcanized after the removal of the continuous phase of the dispersion (water) and its deposit upon the article of footwear by treatment at moderate temperatures for a suitable period of time, the accelerator, if present, being of such a nature as to permit vulcanization at low temperatures.

While the latex above referred to is in the form of creamed latex, other forms of latex such as latex butter, vulcanized latex, pure latex, or compounded latex may be used in my process, and the term "water dispersion of rubber" used in the claims is intended to cover all such varieties of latex or other water dispersions of rubber either natural or artificial.

My process as above disclosed not only produces a superior article but the process in itself is more economical than that heretofore used inasmuch as it avoids to a large extent the use of cements with expensive solvents which cannot economically be recovered in manufacturing processes. The process above outlined requires very little labor, avoids the steps of milling, calendering, cutting and handling the old foxing strips as well as the making of cements, thereby materially reducing the cost of building footwear.

The foxing, patch, back-stay or other member applied to the upper of footwear is tougher than as heretofore made and is without grain such as is always present in calendered stocks that previously have been broken down. Consequently this invention yields a superior product.

For an understanding of the scope of my invention reference should be made to the following claims.

Having thus described my invention, what I claim and desire to protect by Letters Patent is:

1. In the manufacture of footwear, the steps of lasting an article of footwear, applying latex to an exposed surface of the article, and causing the solid constituents of the latex to deposit on the article to form a wear element thereon of substantial thickness.

2. In the manufacture of footwear, the steps of lasting an article of footwear, applying a band of latex to the sides of the article, and causing the solid constituents of the latex to deposit on the article so as to form a foxing.

3. In the manufacture of footwear, the steps of lasting an article of footwear, applying latex to the bottom and the sides of the article, and causing the solid constituents of the latex to deposit on the article to form an external wear portion thereon.

4. In the manufacture of footwear, the steps of lasting an article of footwear and forming a foxing thereon by the deposition of the solid constituents of a water dispersion of rubber in situ.

5. In the manufacture of footwear, the steps of lasting an article of footwear, applying a water dispersion of rubber to an exposed surface of the article, and causing the deposition of the solid constituents of the dispersion, and thereby forming a wear portion on the article of substantial thickness.

6. In the manufacture of footwear, the steps of lasting an article of footwear, applying a water dispersion of rubber to the sides of the article, and causing the deposition of the solid constituents of the dispersion to form a foxing.

7. In the manufacture of footwear, the steps of lasting an article of footwear, applying a water dispersion of rubber to the bottom and sides of the article, drying said dispersion to deposit the constituents thereof on the article, applying a band of the water dispersion of rubber to the side of the article, and coagulating the dispersion to form a foxing in situ.

8. The method of making fabric and rubber footwear which comprises uniting the bottom of an upper to an insole, forming a foxing in situ around the bottom of the upper by the application and drying of a thick coat of a water dispersion of rubber, and finishing the article.

9. An article of footwear having a foxing formed in situ from latex.

10. An article of footwear having a foxing composed of the solid constituents of latex deposited in situ.

11. An article of footwear having a deposition of rubber compound on an exposed surface, said deposition being composed of the solid constituents of a water dispersion of rubber deposited in situ.

12. In the manufacture of rubber articles composed in part at least of fabric, the steps of applying to a limited area of the fabric of the article a water dispersion of rubber composition, and removing the water to form a deposit of the composition whereby a wear element may be formed on the article directly from the aqueous dispersion.

13. In the manufacture of rubber articles composed in part at least of fabric, the step of applying to a limited area of the fabric of the article a water dispersion of rubber composition, removing the water to form a vulcanizable deposit of the composition whereby a wear element may be formed on the article directly from the aqueous dispersion, and finishing and vulcanizing the article.

14. In the manufacture of footwear having an upper of fabric, the steps of applying to a definite area of the fabric upper an aqueous dispersion of rubber composition, and removing the water to form a deposit of the dispersed material and thereby forming a wear element of rubber on the fabric upper directly from the aqueous dispersion.

15. In the manufacture of footwear having an upper of fabric, the steps of applying to a definite area of the fabric upper an aqueous dispersion of rubber composition, removing the water to form a vulcanizable deposit of the dispersed material and thereby forming a wear element of rubber on the fabric upper directly from the aqueous dispersion, and finishing and vulcanizing.

16. In the manufacture of rubber footwear having a fabric upper, the steps of applying an aqueous dispersion of rubber composition to the fabric upper adjacent its connection with the outsole, removing the aqueous portion of the dispersion to form a deposit of the rubber composition, finishing the article, and finally vulcanizing.

Signed at Bristol, county of Bristol, State of Rhode Island, this 18 day of July, 1928.

HAROLD DE BLOIS RICE.